Dec. 30, 1958  J. BERCHTOLD  2,866,903
PROCESS FOR PHOTOELECTRIC REPRODUCTIONS
AND APPARATUS THEREFOR
Filed Oct. 20, 1955
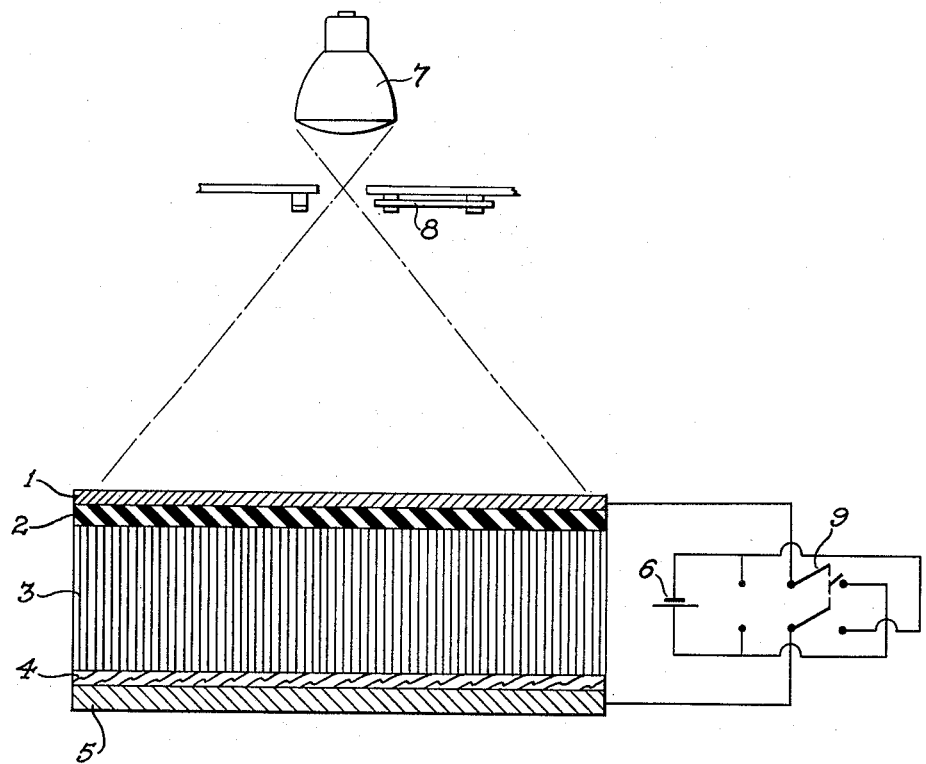
INVENTOR.
JEAN BERCHTOLD
BY
ATTORNEY

2,866,903

PROCESS FOR PHOTOELECTRIC REPRODUCTIONS AND APPARATUS THEREFOR

Jean Berchtold, Zurich, Switzerland

Application October 20, 1955, Serial No. 541,789

Claims priority, application Switzerland November 2, 1954

7 Claims. (Cl. 250—65)

The present invention relates to a process for the formation of photographic or radiographic images utilizing the property of certain substances, namely their photoelectric properties, to vary the resistivity in accordance with the degree of illumination that they receive and apparatus therefor.

The usual photographic method with silver halide has the drawback of requiring a chemical treatment following exposure, that is, development and fixation, in order to make the image appear and to stabilize it. Besides, the layer sensitive to light rays, by the very nature of the process, is destroyed by the process and cannot serve but once.

The novelty in the present invention is to substantially separate the position of the light sensitive element from the place where the photographic image will be developed by using as an intermediary an electrical current.

It is known that certain materials, like selenium or certain metal sulfides have the characteristic of an electrical resistivity that is a function of the intensity of the light by which they are illuminated. If a uniform and homogeneous layer of such a material is illuminated by an image, for example in contact with a transparency, the most strongly illuminated parts of this layer will have a resistance that is less than those parts that are darker. If a uniform electrical field is applied at the same time across this layer there will pass from place to place a current which corresponds essentially to the different degrees of luminosity of the original.

The transformation of these differences in current according to the position of the image into degrees of darkening can be done with the aid of an electrosensitive paper, using any of the electrochemical processes that are known for the formation or the destruction of colors in the neighborhood of one of the electrodes.

Since the impression on the sheet of paper takes place in conformance with the amount of light falling on the illuminated surface of the photoelectric layer, it is then evident that in this manner a photographic reproduction of the original will be formed.

Use of this method is not limited alone to visual rays. In fact most photoelectric materials have a band of spectrosensitivity greater than that of the human eye. With appropriate materials it is then possible to photograph in the ultraviolet and infrared. In addition the sensitivity of certain of these materials to X-rays makes it possible to use them for radiographs in an analogous manner. Therefore, to avoid tiresome repetition, the words light, illumination and so forth as used herein mean electromagnetic waves in general including the perceptible sensations of the human eye as well as the effects of infrared, ultraviolet and X-rays.

The invention is also concerned with an apparatus to put the procedure into operation and is composed of the following elements schematically shown in the drawing.

Number 3 shows a film having the characteristic of an electrical conductivity strictly limited to its transverse direction.

Number 2 represents the layer with photoelectric properties of hexagonal selenium or other appropriate material applied upon the preceding layer.

Number 1 is a thin conductive film, a good conductor of electricity but only a weak absorber of luminous rays and deposited upon the photoelectric layer.

A moist paper 4 impregnated with a material able to undergo a change of tone by the passage of an electrolytic current across it is compressed between the film 3 and the opposite conductive electrode 5.

The source of external current 6 is applied between film 3 and the conductive film 5, eventually by the use of a mechanism that is mentioned below.

In considering the different elements of this apparatus one will see that a luminous ray from a suitable source 7 striking a place somewhere on film 1 will cause by the action of a localized current passing transversely through 3, an impression on the paper 4 that results in the fixation of the image received. The role of film 3 is to separate the photoelectric layer 2 from the paper 4 and to keep it free of its moisture whose electrochemical action during the passage of the current would be bad for it. Furthermore film 3 constitutes a support for layer 2 which preforce is thin and fragile.

Formation of such films has been accomplished in the following manner: Some thin lacquered wire, such as copper wire used in electrical windings is first unwound onto a rack in a manner so that most of the unwound wire may be strictly rectilinear and parallel. After having impregnated, preferably in the absence of air, this bundle of wires with an insulating material which is a liquid that later solidifies and will not be changed by a temperature in the neighborhood of 200° C., such as a synthetic thermosetting resin, the rectilinear bundles are cut into bundles of the desired thickness. In re-uniting these bundles side by side by means of a material with the same properties as that mentioned above and after settling the bundles into the desired rectilinearity, one obtains a film of the desired size composed essentially of sections of metallic wire, insulated from each other and held together by an insulating material. By its composition such a film will then have an electrical conductivity strictly limited to its transverse direction.

For films made of copper wire it is deemed useful to deposit electrolytically a light coating of nickel upon one of its surfaces, that is to say upon the cutting of the wires in order to obtain good adherence to selenium. This nickel layer should not be so thick as to short-circuit neighboring wires.

The layer of selenium deposited upon the film 3 must be very homogeneous and uniform and make perfect contact with the supporting film. Methods useful in the process of making dry commutators or photovoltaic cells have given satisfactory results.

According to one method used, for example, amorphous selenium powder is spread in a uniform layer upon film 3. Simultaneously with rapid increase in temperature to about 120° C. a pressure of about 50 atmospheres is exerted against one side with the help of a flat press of stainless steel or of a thick plate of glass, in either case of the same size as film 3 and having a polished surface. The amorphous selenium being thermoplastic forms a flux of grains which weld into a compact mass folowed by crystallization. It is not deemed necessary to exclude air, the air within the grains or between the grains being able to escape before the selenium crystallizes into a mass if the rise in temperature is sufficiently rapid and the pressure sufficiently great. The size of the grains has a strong influence upon the results obtained. The nuclei of crystallization being concentrated on the surface of the grains, powdered selenium that is too fine contains too large a number of nuclei and can crystallize before it is brought into a compact layer. Grains of 50 to 120 microns in size have given the best results. When the allotropic modification of selenium has ended, the temperature is raised to about 180° at the same time maintaining the pressure in order to reduce the electrical resistivity and to increase the sensitivity to light of this material.

The thickness of the selenium layer naturally influences very strongly its resistivity and sensitivity. Although it is advantageous to apply a layer of it as thin as possible, such a thin coating is very difficult to obtain in a uniform manner. High sensitivity has been obtained with coatings about 50 microns thick.

The external electrode of this layer must have properties which require a compromise: Its electrical conductivity must be large enough to furnish the electrical current necessary for the apparatus to function without notable drop in voltage and at the same time be as transparent to luminous rays as possible. Furthermore, the contact of this film with the photoelectric layer must be excellent to avoid formation of a high resistance. This same precaution is likewise to be observed in the contact between layer 2 and layer 3.

A thin layer of gold evaporated on the selenium under vacuum was found satisfactory for this purpose. The electrical resistance can be reduced without increasing its opacity by employing a successive layer of a transparent metallic oxide that is a good conductor of electricity. This layer could not be applied directly upon the selenium, the mechanism of the conductivity of these two semi-conductors being of a contrary nature so that it would form a barrier layer of high resistance between the two bodies.

The transformation of the intensity of the current, varying from place to place as a function of the light received, into values of tonality is done according to the invention with the aid of a moist electrosensitive paper.

A formation of dye useful for this purpose is obtained from colorless chemicals, for example, by coupling of aromatic diazonium compounds with an aromatic amine or phenol, the reaction being initiated by increase of pH in the neighborhood of a cathode and resulting from the passage of current.

Decolorization of an appropriate dye results, for example, in the neighborhood of the anode that is chemically inert, by the electrochemical evolution of chlorine, the electrolyte containing a soluble chloride. Other methods of forming or destroying dye seem to be possible using changes in pH, oxidation or reduction potential and resulting from the passage of current.

It is to be noted that this formation or destruction of dye takes place almost simultaneously with the passage of current so that the final image is formed during the exposure itself.

The opposite electrode to be applied to the sensitive paper against the free side of film 3 is formed by film 5. A gentle and uniform pressure together with an inert chemical is obtained in this manner by using a film of metal covered with a layer of rubber that is a good conductor of electricity.

The resistance of selenium in darkness is not infinite as would be desired for this process. In order to use only the difference of conductivity induced by the luminous flux, it is necessary to have recourse to an artifact. In effect if one illuminates a photoelectric film by regular intermittencies, and if at the same time inverts the voltage applied during the periods of no light, the effective current resulting from the difference of these two antagonistic currents will depend directly upon the action of the light. In this manner the conductivity in darkness is practically eliminated and there results thereby a great improvement in photographic contrast.

Interruption of the luminous rays can be made by means of a shutter 8 or by interrupting the electrical circuit of the luminous source. Inversion of the current serving the apparatus and interruption of the current of the luminous source can be done easily by suitable means 9 such as a reversing switch actuated by any suitable means such as a vibrating relay or by a motor, not shown. Ganging means are also provided for the shutter and reversing switch. In principle it is equally possible to serve the apparatus with an alternating current from a circuit and the light source with a pulsating current provided by one rectified phase of the same circuit, the light source being of low inertia, such as a fluorescent lamp.

The frequency of such a periodic system is limited on the high side by the phenomenon of inertia of selenium which is shown in a delay of response to variations in luminosity and in a weakening of the current modulated by high frequencies. The lower limit results from the necessity of using a minimum number of periods or interruptions for the exposure.

The sensitivity obtained, that is to say the inverse of the time needed for exposure by a given light, depends on the thickness of the selenium layer and upon the voltage applied to it. Although an increase in voltage results in an increase in sensitivity, the photographic contrast is found to be reduced. One can use for different films voltages varying between 4 and 150 volts.

The photographic operation thus is explained as follows: A sheet of paper 4 previously dipped in a bath of the material able to render it electro-sensitive, is compressed between the film with transverse conductivity 3 and the opposite electrode 5. The image to be reproduced may be projected optically or may be illuminated through a transparency on the photosensitive layer, the light and the current of the apparatus being engaged by using a synchronizing mechanism mentioned above. After the necessary time of exposure the copy so formed is withdrawn from the apparatus and dried. If one uses as the color forming material a diazonium compound it is possible to use the photochemical sensitivity of this family of compounds to ultraviolet rays to destroy the unused residue of it by exposure to a mercury lamp preferably on both sides of the paper. In this manner one will get a perfectly stable copy. Other suitable electrosensitive papers are described in U. S. 655,970, U. S. 2,294,149, and U. S. 2,358,839.

The advantages of this process may be summarized as follows: The copy material itself for practical purposes is not light sensitive. Omission of silver salts gives an economic process. Further chemical treatment after exposure is superfluous, the copy formed during exposure itself. According to convenience it is possible to make copies in the negative or positive by simply employing different kinds of sensitive paper.

A sensitivity approaching that of the eye can easily be achieved with the aid of filters. The sensitivity of selenium or other appropriate substances outside of the visible spectrum can be used for photography with an apparatus of analogous constitution by means of ultraviolet or infrared rays or to make radiographs.

I claim:

1. An image translating apparatus for reproducing an image on a sensibly wet chemically wetted electrosensitive paper comprising a first and second spaced uniformly electrically conductive electrodes disposed substantially parallel relative one another, a transversely electrically conductive and laterally non-conductive, liquid-impervious, chemically inert spacing member, a substantially uniform and homogeneous layer of a photoconductive material on a face of said spacing member in electrical contact with the first of said electrodes, the first electrode having the characteristics of being a good electrical conductor and having a low absorption of radiant energy, the second of said electrodes being substantially plane and having a surface adapted and disposed for compressing and holding the electrosensitive paper in surface contact with and against the spacing member at a substantially uniform pressure, the sensibly wet paper being disposed against a face of the spacing member opposite to said photoconductive layer, whereby the spacing member provides directional conductivity between the photoconductive layer and the wet paper and electrical currents flowing in each unit portion of the spacing member are applied to the corresponding portions of the electrosensitive paper and the liquid on said paper is unable to come into contact with said photoconductive layer, means connected for impressing an electric potential on the two electrodes, means for selectively exposing said photoconductive layer through said first electrode to a pattern of modulated radiant energy rays comprising the image to be reproduced and having different intensities, whereby current flows through the unit portions of said photoconductive layer in proportion to the intensity of the incident radiant energy and a visible image is formed on the electrosensitive paper substantially simultaneously with exposure.

2. An image translating apparatus for reproducing an image on a sensibly wet chemically wetted electrosensitive paper comprising; a first and second spaced, uniformally electrically conductive electrodes disposed substantially parallel relative one another; a transversely electrically conductive and laterally non-conductive, liquid-impervious, chemically inert spacing member; the spacing member having opposite faces at least one of which is planar and being transversely conductive in a direction corresponding to a direction between said opposite faces; a substantially uniform layer of a photoconductive material on a face of said spacing member in electrical contact with the first of said electrodes, the first electrode having the characteristics of being a good electrical conductor and having a low absorption of electromagnetic radiation, the second of said electrodes being substantially plane and having a surface adapted and disposed for compressing and holding the electrosensitive paper in surface contact with and against the planar face of the spacing member at a substantially uniform pressure, the sensibly wet paper being disposed in surface contact with the whole area of the planar face of the spacing member opposite to said photoconductive layer, whereby the spacing member provides directional conductivity between the photoconductive layer and the wet paper and electrical currents flowing in each unit portion of the spacing member are applied to the corresponding portions of the electrosensitive paper and the liquid on said paper is unable to come into contact with said photoconductive layer, means connected for impressing an electric potential on the two electrodes, means for selectively exposing said photoconductive layer through said first electrode to a pattern of modulated electromagnetic radiation comprising the image to be reproduced and having different intensities, whereby current flows through the unit portions of said photoconductive layer in proportion to the intensity of the incident electromagnetic radiation and a visible image is formed on the electrosensitive paper substantially simultaneously with exposure.

3. Apparatus according to claim 2, in which said first electrode comprises a moisture excluding metallic layer comprising gold bonded on said photoconductive material.

4. Apparatus according to claim 3, in which the layer comprises an electrically conductive metal oxide bonded on a layer of gold.

5. Apparatus according to claim 2, in which the transversely conductive spacing member comprises a plurality of closely spaced fine metal wires of equal lengths and means substantially chemically inert for insulating them circumferentially so as to insulate them from one another and to hold them in fixed spaced relationship, the wires being substantially normal to the photoconductive layer and terminating at said planar face having contact with the wetted paper.

6. Apparatus according to claim 2, in which the second electrode comprises a metallic plate and the surface in contact with the electrosensitive paper is covered with a layer of electrically conductive rubber.

7. Apparatus according to claim 2, further including means to selectively and periodically interrupt said electromagnetic radiation during the exposure, and means for reversing the polarity of the potential during the interruptions of the electromagnetic radiation, whereby photographic contrast is improved on the visible image reproduced on the electrosensitive paper.

References Cited in the file of this patent

UNITED STATES PATENTS

| 1,880,289 | Sukumlyn | Oct. 4, 1932 |
| 2,692,948 | Lion | Oct. 12, 1954 |
| 2,764,693 | Jacobs et al. | Sept. 25, 1956 |

FOREIGN PATENTS

| 188,030 | Great Britain | Oct. 23, 1922 |
| 464,112 | Great Britain | Apr. 12, 1937 |